S. SILNES.
COUPLING DEVICE.
APPLICATION FILED JAN. 29, 1920.
1,349,300.
Patented Aug. 10, 1920.
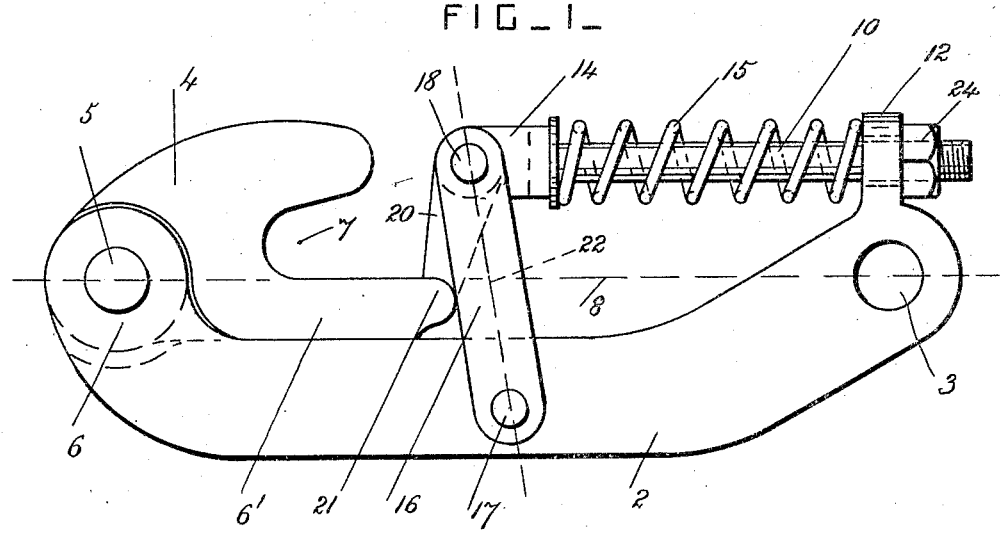
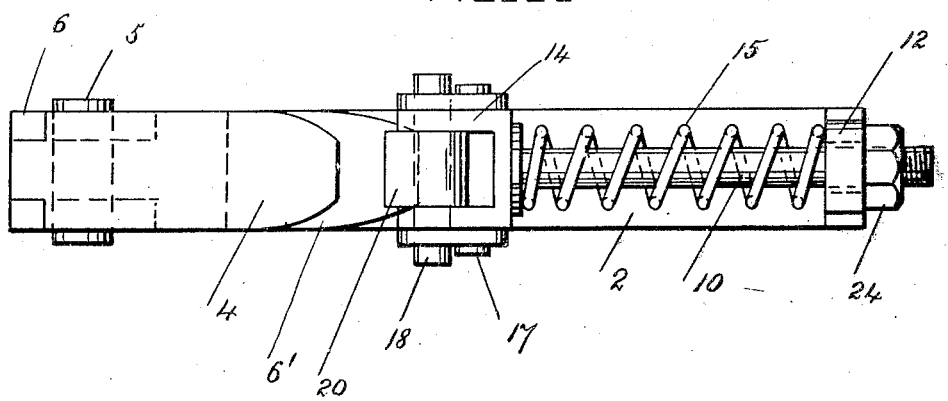
Inventor.
Sigvart Silnes
by Herbert W. T. Jenner
Attorney.

UNITED STATES PATENT OFFICE.

SIGVART SILNES, OF HALMA, MINNESOTA.

COUPLING DEVICE.

1,349,300. Specification of Letters Patent. Patented Aug. 10, 1920.

Application filed January 29, 1920. Serial No. 354,760.

*To all whom it may concern:*

Be it known that I, SIGVART SILNES, a citizen of the United States, residing at Halma, in the county of Kittson and State of Minnesota, have invented certain new and useful Improvements in Coupling Devices, of which the following is a specification.

This invention relates to couplings for agricultural and other machines which are subjected to sudden strain; and it consists in the novel construction and combination of the parts hereinafter fully described and claimed whereby the load is released automatically from the tractor when it exceeds a predetermined maximum. This device is specially well adapted for coupling plows and other similar machines to tractors.

In the drawings, Figure 1 is a side view of an automatically releasable coupling constructed according to this invention. Fig. 2 is a plan view of the same.

A frame 2 is provided and has an eye 3 at one end or other approved means for securing it to the tractor or traction engine. A hook 4 is pivoted by a pin 5 to a double-eye 6 on the other end portion of the frame 2, and this hook has a stem 6' which projects rearwardly and rests on the frame so that the center 7 of the curved portion of the hook is a little above a line 8 drawn through the centers of the eye 3 and the double-eye 6.

A bolt 10 is arranged to slide longitudinally in a guide 12 on the frame, and it has a double-eye 14 at its front end. A helical spring 15 is arranged around the bolt between the double-eye 14 and the guide 12. Radius links 16 are pivoted to the frame 2 by a pin 17, and to the double-eye 14 by a pin 18. An arm 20 is pivoted on the pin 18 in the fork of the double-eye 14, and its other end portion is articulated to the stem 6' of the hook by a knuckle-joint 21.

The arm 20 is arranged between the two radius links, and the center of the knuckle-joint is arranged a little in front of the line 22 drawn through the centers of the pins 17 and 18.

The bolt 10 has a nut 24 screwed on it for adjusting the strength of the spring 15 to the maximum load. The plow or other machine is connected to the hook, and when an excessive strain is put on it, the spring 15 is compressed by the stem 6' and arm 20, and the hook is moved pivotally on its pin 5 so that the load is released automatically, thereby preventing the breakage of parts which might be difficult to replace at short notice.

What I claim is:

1. An automatically releasable coupling, comprising a frame, a hook pivoted to the front end portion of the frame and provided with a rearwardly projecting stem, a spring-controlled bolt slidable longitudinally in the rear end portion of the frame, a radius device pivoted to the front end portion of the bolt and to the frame, and an arm pivoted to the front end portion of the bolt and articulated with the rear end portion of the said stem.

2. An automatically releasable coupling, comprising a frame, a hook pivoted to the front end portion of the frame and having a stem which normally rests on the frame, a spring-controlled bolt slidable longitudinally in the rear end portion of the frame and having a double-eye at its front end, radius links pivoted to the double-eye and to the frame, and an arm pivoted centrally to the double-eye and articulated with the rear end portion of the said stem.

In testimony whereof I have affixed my signature.

SIGVART SILNES.